Feb. 27, 1962     M. A. PROVI     3,022,845
BATHROOM SCALES
Filed April 28, 1958     5 Sheets-Sheet 1

INVENTOR.
MIKE A. PROVI
BY
Andrew H. Wintercorn
ATTORNEY

Feb. 27, 1962 M. A. PROVI 3,022,845
BATHROOM SCALES
Filed April 28, 1958 5 Sheets-Sheet 2

INVENTOR.
MIKE A. PROVI
BY

ATTORNEY

Feb. 27, 1962  M. A. PROVI  3,022,845
BATHROOM SCALES
Filed April 28, 1958  5 Sheets-Sheet 3

INVENTOR.
MIKE A. PROVI
BY
*Andrew F. Wintercorn*
ATTORNEY

Feb. 27, 1962 M. A. PROVI 3,022,845
BATHROOM SCALES
Filed April 28, 1958 5 Sheets-Sheet 4
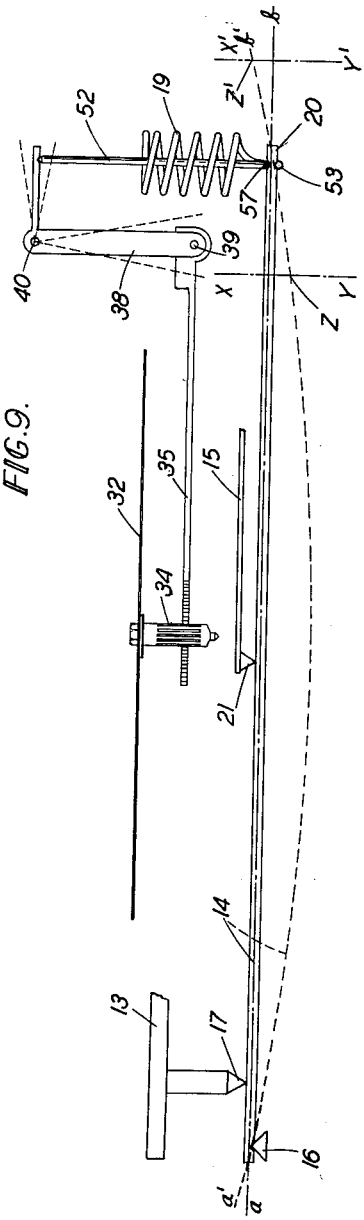
INVENTOR.
MIKE A. PROVI
BY
ATTORNEY

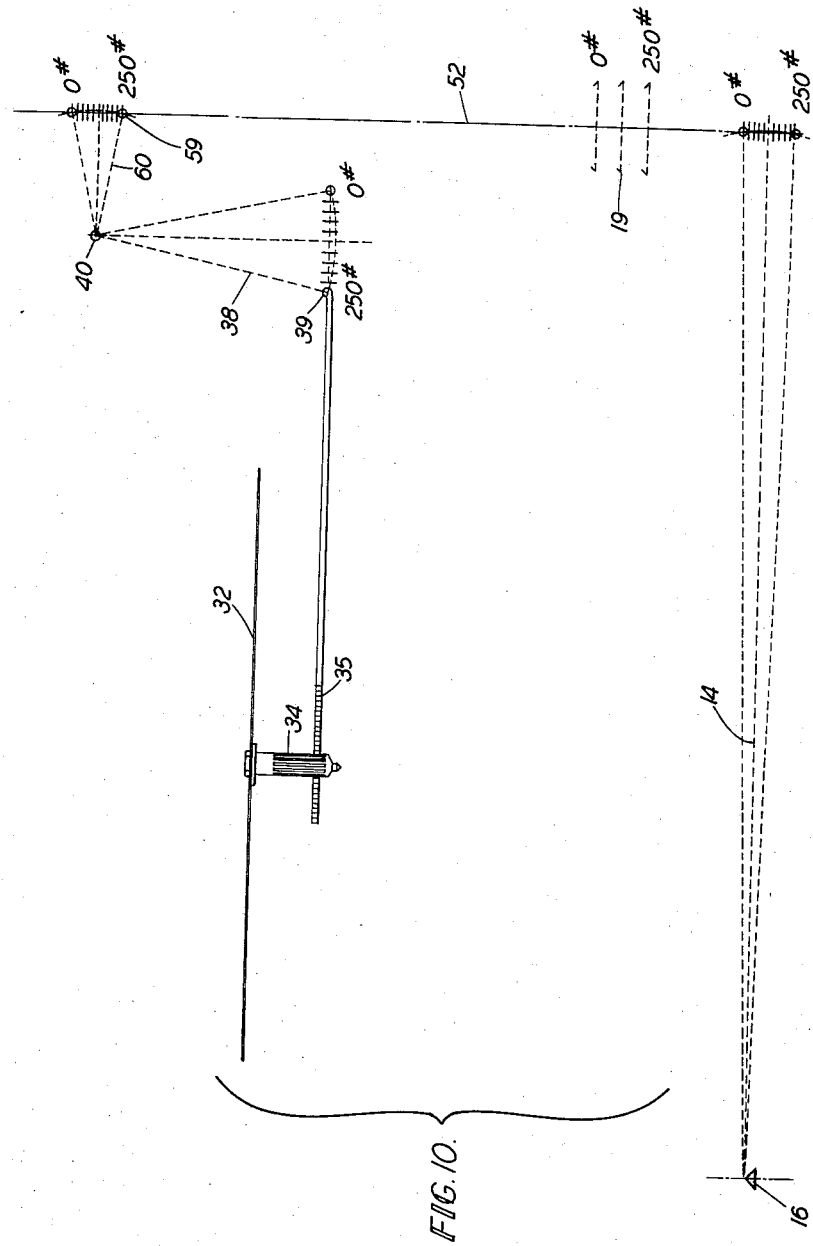

3,022,845
BATHROOM SCALES

Mike A. Provi, Rockford, Ill., assignor to The Brearley Company, Rockford, Ill., a corporation of Illinois
Filed Apr. 28, 1958, Ser. No. 731,283
24 Claims. (Cl. 177—230)

This invention relates to a new and improved bathroom scale construction.

The principal object of my invention is to provide a weighing scale of relatively low cost, light gauge sheet metal construction, having weight indicating means precisely responsive to the linear extension of the weighing spring whenever load is applied to the platform, even under the most adverse operating conditions, such as when the scale is given uneven support on an uneven floor or is given yielding support on a rug or carpet, either of which conditions causes more or less distortion of the base and/or platform and/or lever system, as a result of which the weight indication, with conventional constructions heretofore available, is invariably inaccurate, the inaccuracy varying according to the degree of twist or distortion of the scale.

The salient feature of my invention is the provision of a follower pin movable on the center line of the coiled tension spring whereon the lever system of the scale is suspended, the pin faithfully and accurately registering the exact amount of extension of the spring under all operating conditions and transmitting a corresponding amount of movement to the weight indicating means so as to give an accurate reading. With this construction, inasmuch as the arcuate movement of the outer end of the main lever is translated through the pin in the center of the spring into a corresponding arcuate movement of one arm of a bell-crank lever, the other arm of which in the arcuate movement of its free end translates the movement into linear movement of the rack operating the pinion connected to the weight indicating dial, it follows that the well known "arc losses" (as known as the trade) are substantially entirely eliminated, to the extent that error in weight indications is practically negligible, being less than ⅛ of 1% by actual tests.

Another object of the invention is to provide a weighing scale in which the weight indicating mechanism, in order to give more accurate readings directly correlated with the linear extension of the weighing spring, has the operating connections designed to avoid introduction of errors due to slippage, all connections involving true fulcrum action or as close to that as practicable. In this connection, the follower pin in the center of the spring operating the weight indicating means has movement transmitted thereto positively at the point where the spring is connected with the platform supporting lever, and the fulcrum is defined in any one of several ways, as by a pointed end on the pin engaging in the apex of a V-notch in the lever, or on a flat surface provided on the lever, or by a transverse pivot pin pivotally connecting the follower pin to the lever, or an arcuate surface is provided on the lower end of the pin engaging an arcuate surface provided on the lever, all with a view to eliminating chordal losses or conflicting arc to chordal losses common with other prior constructions, where the spring extension was not measured directly on the center line of the spring but instead was invariably measured either short of or beyond said center line.

The invention is illustrated in the accompanying drawings, in which—

FIG. 4 is an enlargement of a portion of FIG. 1 to approximately twice full size;

FIG. 4a is a further enlargement of a portion of FIG. 3;

FIG. 4b is a top view of FIG. 4a;

FIG. 9 is a more or less diagrammatic or schematic view related to FIG. 1 to illustrate the principle of my invention, and FIG. 10 is another schematic drawing related to FIG. 9 to further illustrate the principle of my invention.

Similar reference numerals are applied to corresponding parts throughout the views.

Figure 1:
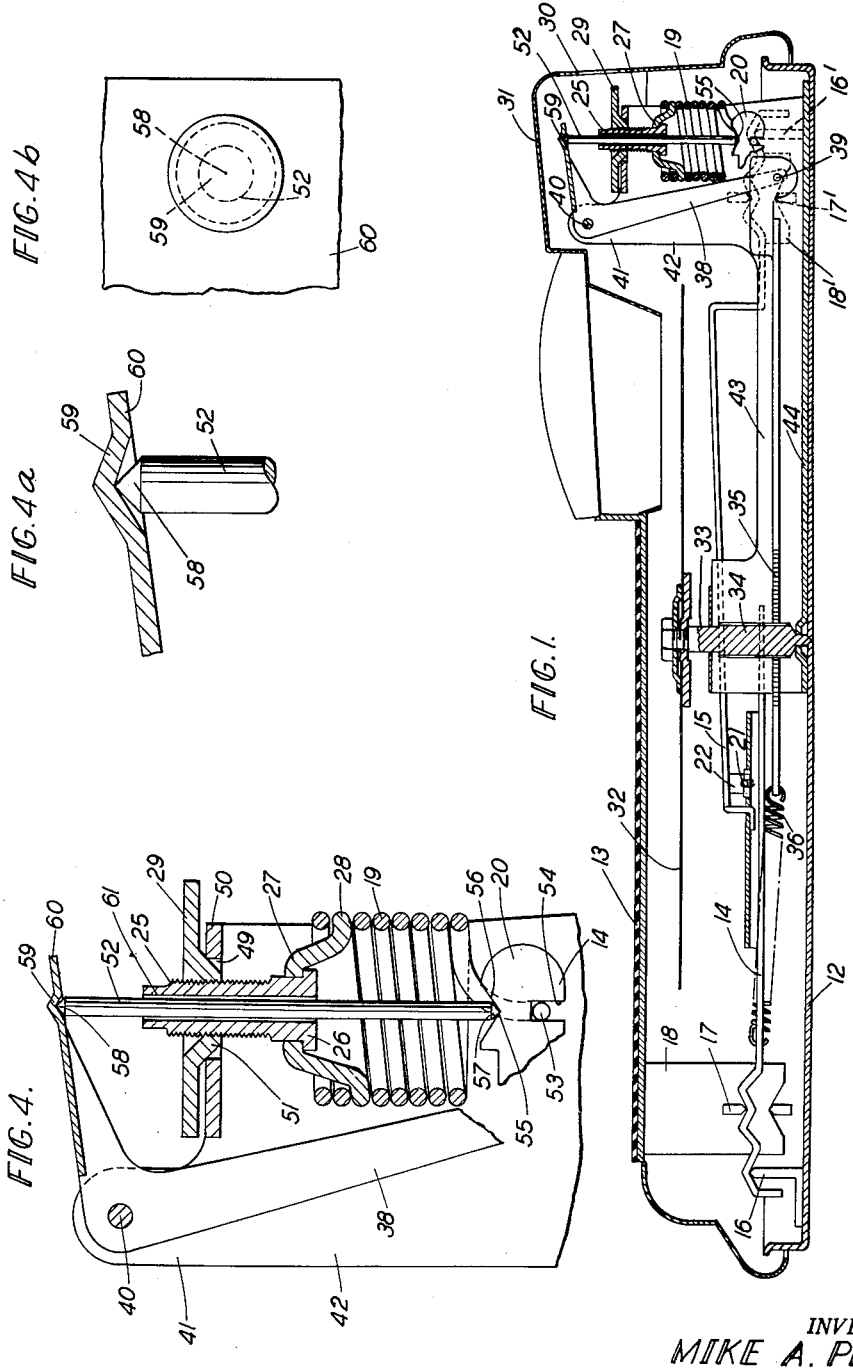
FIG. 1 is a longitudinal section on a reduced scale of a bathroom scale made in accordance with my invention.
Figure 2:
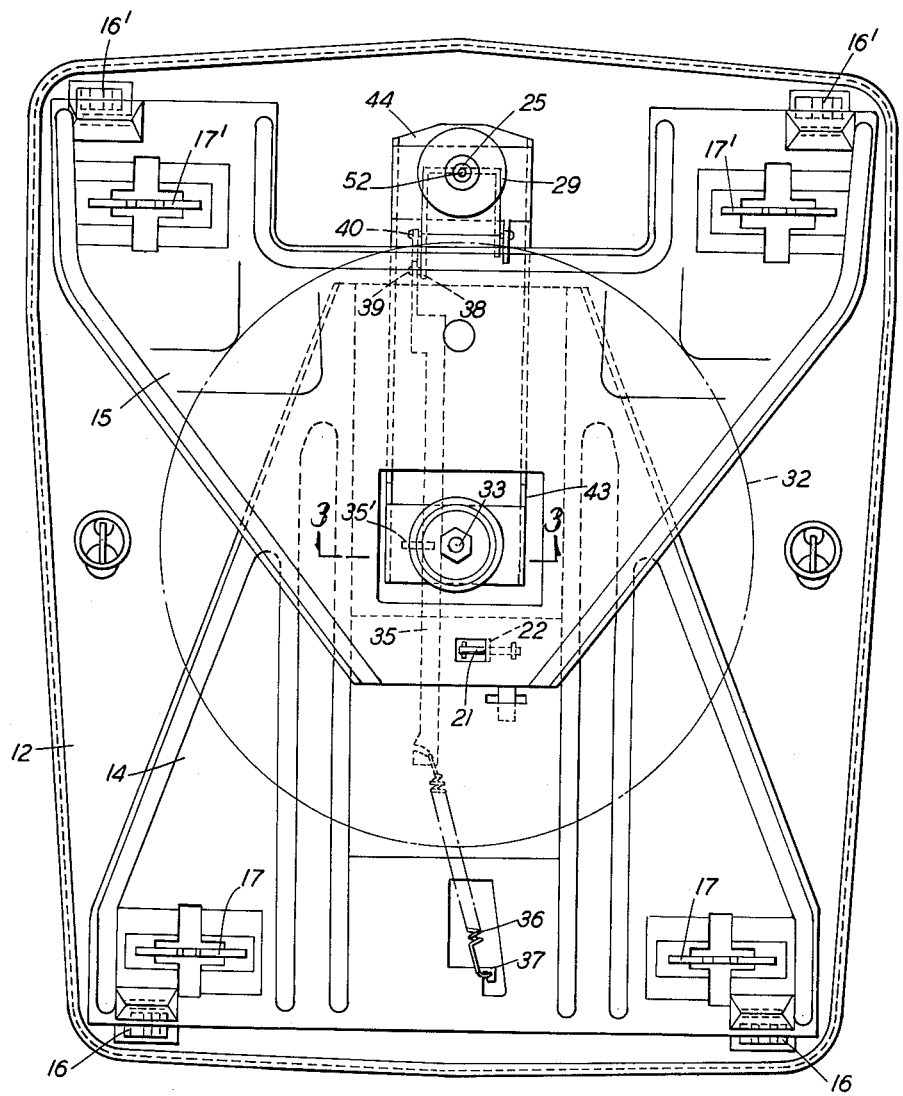
FIG. 2 is a plan view of the scale mechanism with the platform and weight indicating dial removed, the location of the latter being indicated only by dot and dash lines.
Figure 3:
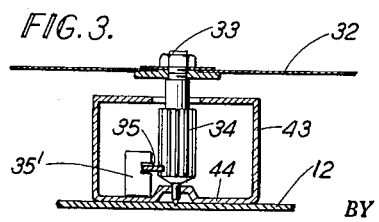
FIG. 3 is a sectional detail on line 3—3 of FIG. 2.

Referring first to FIGS. 1 to 4b, the bathroom scale illustrated, to which my invention has been shown applied, is similar to that disclosed in my Patents No. 2,667,387 and No. 2,668,045, the reference numeral 12 designating the generally rectangular sheet metal base or bottom pan thereof, and 13 the generally rectangular sheet metal platform supported on said base by means of two stamped sheet metal levers 14 and 15, lever 14 being supported on the base 12 on a pair of fulcrums 16 and carrying a pair of hangers 17 on which rest a pair of downwardly projecting legs 18 for support of the rear end portion of the platform 13. In a similar manner, lever 15 is supported on the base 12 on another pair of fulcrums 16' and carries a pair of hangers 17' on which rest another pair of downwardly projecting legs 18', like the legs 18, for support of the front end portion of the platform 13. A coiled tension spring 19 serves as the weighing spring and is suspended above the front end portion of the base 12 for suspension of the front end portion 20 of the lever 14 to resist downward deflection thereof under the weight imposed thereon when a person stands on the platform 13, as when weighing himself. Weight imposed on the platform 13 is transmitted directly to the lever 14 through legs 18 provided under the rear end portion of the platform, but the weight imposed by the front end portion of the platform 13 on lever 15 is transmitted through said lever to the middle portion of lever 14 at the rear end of the lever 15, where there is a hanger 21 pivotally supported at its coaxially aligned ends on the lever 14 and having the notched lower end of a downwardly bent lug 22 on the rear end portion of lever 15 engaged in the downwardly offset crank pin portion provided in the middle of said hanger 21. A tubular screw 25, on the headed lower end 26 of which a cupped washer 27 is swivelled and adjustably connected with the upper end portion of spring 19 in the usual way, as indicated at 28, is suspended on a hand-nut 29 accessible for manual adjustment through an opening 30 provided in a cover plate 31 mounted on top of the platform 13 at the front end thereof, the nut 29 being adjusted one way or the other to adjust the spring 19 up or down in order to set the scale back to zero when and if it gets out of adjustment and requires re-setting. It is the downward deflection of the front end portion 20 of the lever 14 against the resistance of spring 19 that is used to cause rotation of the weight indicating dial 32. This dial is carried on a vertical shaft 33 supported for rotation over the center portion of the base 12, and a pinion 34 is provided on the lower end portion thereof for transmitting rotation thereto. A rack 35 is free to float in a guide 35' (so that it can rise and fall in following the arc of travel of the lower end of lever 38) and meshes with the pinion 34 and is biased toward it by a light coiled tension spring 36 that is attached at one end to the rear end of the rack and at its other end to a lug 37 provided on the rear end portion of lever 14. The spring 36, in addition to holding the rack 35 resiliently in engagement with pinion 34, exerts enough pull on the rack to operate the dial 32 whenever the rack is free to move, as when the lever 14 is given downward deflection in a weighing operation, a bell-crank lever 38 pivotally connected at 39 to the front end of rack 35 being then allowed to oscillate from its zero position through an angle, the size of which is proportionate to the amount of extension of spring 19 and downward deflection of lever 14, so as to cause rotation of dial 32 through a proportionate angularity and accordingly indicate accurately the weight of the person standing on the scale. Bell-crank lever 38 is pivoted with respect to the base 12 on a horizontal axis, as indicated at 40, a horizontal extending pin providing this pivot, the pin extending through laterally spaced registering holes provided in laterally spaced portions of said lever and being supported in a bracket 41 that is mounted on top of the front end portion 42 of an elongated sheet metal channel-shaped member 43 that serves also to support the dial and pinion on its rear end and is mounted by means of its web portion 44 on the front middle portion of the base 12, in accordance with the disclosure in the copending application of myself and Harry L. Mattson, Serial No. 453,267, filed August 31, 1954.

A circular hole 49 in the transverse horizontal web portion 50 of bracket 41 receives the tapered portion 51 of the hand-nut 29 for support of the spring 19 and suspension of the front end portion 20 of lever 14. It is due to the fact that, in accordance with the present invention, the downward deflection of the front end portion 20 of the lever 14 against the resistance of spring 19 is reflected so accurately by endwise movement of a follower pin telltale element 52 extending through the tubular screw 25 and hence disposed accurately on the center line of the spring 19, that I obtain such close accuracy in weight readings on dial 32. The lower end of the pin 52 moves accurately with the loop 53 on the lower end of the spring 19 received in the slot 54 in the front end portion 20 of the lever 14 by reason of the pin being fulcrumed on the front end portion 20 of the lever 14 at 55 in the apex of a V-shaped notch 56 provided therefor in the top of said front end portion 20 in closely vertically spaced relation to the upper end of slot 54. The lower end of pin 52 is conically pointed, as at 57, to make for a low-friction fulcrum and accordingly greater accuracy in the indicated weight reading. In like manner, the upper end 58 of the pin 52 is conically pointed, and this end is fulcrumed in the center of a conical depression 59 struck upwardly in the web portion 60 of the almost horizontal forwardly extending arm of the bell-crank lever 38, whereby again to insure a low friction fulcrum for greater accuracy in weighing. The pin 52 has a loose fit in the tubular screw 25 as indicated by the clearance 61 shown in FIG. 3 so that there is no danger of friction interfering with the freedom of endwise movement of the pin and accordingly being reflected by errors in the indicated weight.

In operation, the washer 27 will be adjusted with respect to spring 19 in a separate operation before this assembly is assembled in the scale. Then, in the calibration of the scale, the washer 27 will be adjusted slightly up or down on the spring 19 as required. Thereafter, the user need adjust only the hand-nut 29 occasionally whenever the scale does not happen to return to zero after use. No other adjustments are necessary. In the event a person jumps on the platform 13, no harm can be done, inasmuch as the bell-crank lever 38 is always operated gently in response only to the light tension of spring 36, regardless of how suddenly and roughly the lever 14 may be deflected downwardly. Whenever the follower pin 52 moves downwardly away from the conical depression 59, as when a person jumps on the platform, the conical upper end 58 of the pin is soon thereafter returned to the center of the conical depression 59 when the parts return to their normal relationship, the pin 52 being guided in this return movement partly by the bore 61 in screw 25 and partly by the conical depression 59. In each weighing operation, the lower end 57 of pin 52 moves on the arc of movement of the outer end 20 of lever 14 substantially the same as the loop 53 on the lower end of spring 19, while the upper end 58 of the pin 52 moves on the same arc as the depression 59 about the pin 40 as a center in the oscillation of the bell-crank lever 38, and, inasmuch as the pivotal connection 39 of the bell-crank lever 38 with the rack 35 also moves in an arc with the pin 40 as a center, it is manifest that no error is introduced in the weight reading by reason of the reading being taken on the chord of an arc at any one of the three places mentioned, because of relative sliding motion, inevitable with the various prior art constructions. It should also be evident that regardless of how light or heavy is the person weighed, there is the same accuracy of weighing, inasmuch as flexing of lever 14 more or less in accordance with the weight applied does not affect the accuracy of the weight indication, due to the fact that with my improved construction the weight indicated depends only upon the amount of extension of the spring 19 and is completely independent of any distortion of the levers 14 and 15 under weight. By the same token, it follows that with my improved construction, the accuracy of weighing is not affected by any distortion of the base 12 due to the scale resting on an uneven floor or resting on a rug, or partly on the floor and partly on a rug. With my invention, the scale construction is not complicated to any extent in order to obtain such accuracy of weighing, whereas in some prior art constructions, the base was either made exceptionally thick to minimize distortion and accordingly minimize inaccuracy, or was reinforced with that object in view. In certain other prior art constructions, the weighing mechanism was elevated relative to the base or bottom pan in a rather complicated fashion with a view to isolating the weighing mechanism from the distortion of the base and thus obtain the desired accuracy of weighing. Other proposals involved equal complications in the scale construction without obtaining the accuracy of the present invention, in which the error shown on the weight indicating means is truly negligible, being of an order of less than ⅛ of 1% by actual test.

Figure 5:
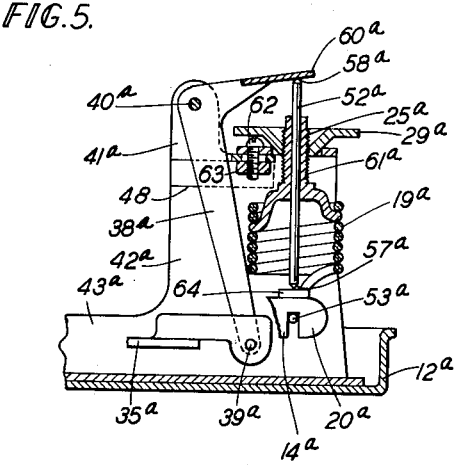
FIGS. 5, 6, 7 and 8 are views similar to the front end portion of FIG. 1 showing modified or alternative constructions.

Turning now to FIG. 5 the follower pin 52a, it will be understood corresponds in all respects to pin 52 of FIGS. 1 to 4b, the same having a conically pointed lower end 57a and a conically pointed upper end 58a and having a working fit in the bore 61a of the screw 25a. Pointed upper end 58a is slidable on the flat under side of arm 60a of bell-crank lever 38a, thus making fore and aft adjustment of the lever support relative to pin 52a possible for calibration purposes. The screw 25a suspends the spring 19a on the hand-nut 29a. The support for bell-crank lever 38a is adjustable fore and aft relative to pin 52a in the calibration of the scale and is arranged to be clamped either by means of two screws like that shown at 62 threading in nuts 63 or by means of screws like those shown at 45 in FIG. 7, threading in holes 46 in member 43a and extending through slots 47 provided in the downwardly projecting side portions 48 of the bracket 41a to clamp the bracket 41a in adjusted relationship to the front end portion of 42a of the channel member 43a.

With this construction of FIG. 5, the lower end 57a of the pin 52a, which rests on top of a flat pad 64 provided on the front end portion 20a of the lever 14a, moves on substantially the same arc with the loop 53a on the lower end of spring 19a about the fulcrum 16 as a center, and the pivot 39a moves in an arc with the pin 40a as a center, and, due to the shortness of the arc of movement of the arm 60a of the bell-crank lever 38a about the pin 40a as a center in a weighing operation very little error is introduced as a result of movement of the upper end 58a of the pin 52a on the chord of an arc. The accuracy of weighing obtainable with this form is still much closer (by virtue of the pin 52a) than with prior art structures, although not as close as with the construction of FIGS. 1–4b.

Figure 8:
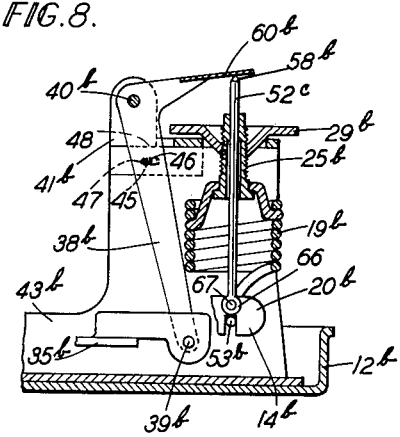
Figure 7:
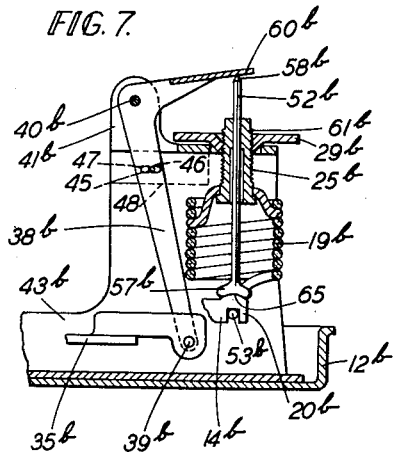

The constructions of FIGS. 7 and 8 are similar to that of FIG. 5. In FIG. 7, the pin 52b has its conically pointed upper end 58b engaging the flat under side of the arm 60b of bell-crank lever 38b in the same manner as in FIG. 5 while the pin is closely guided in the bore 61b of the screw 25b. The lower end 57b of the pin 52b has a concave curvature matching the convex curvature 65 provided on top of the end portion 20b of lever 14b, this convex portion 65 being struck on an arc with the middle of the loop 53b of spring 19b as a center. In FIG. 8, wherein most of the parts are numbered the same as in FIG. 7, being alike, the only difference is that pin 52c, guided in screw 25b, has a flattened lower eye end 66 pivotally connected by a pin 67 to one side of the front end 20b of lever 14b.

In the operation of these constructions, the lower end 57b of pin 52b and lower end 66 of pin 52c move substantially on the same arc as the loop 53b of spring 19b about the fulcrum 16 of lever 14b as a center, and of course the pivot 39b moves in an arc with the pin 40b as a center, the same as in the construction of FIG. 5, so that the only error that can be introduced is very small, that being where the upper end 58b of the pin 52b or 52c moves along the short chord of the arc of travel of the arm 60b about the pin 40b as a center.

Figure 6:
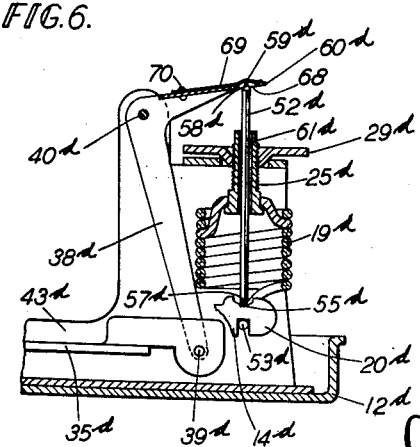

The construction of FIG. 6 more closely resembles that of FIGS. 1 and 4, the pin 52d having its conically pointed lower end 57d fulcrumed in the V 55d provided on top of the outer end 20d of lever 14d just above the place where the loop 53d on the lower end of the spring 19d is connected with the lever 14d, and the pin being loosely guided in bore 61d in screw 25d. However, in this case the conically pointed end 58d of the pin extends through a hole 68 in the outer end portion of the arm 60d of the bell-crank lever 38d and is engaged in a conical depression 59d provided in a leaf spring 69 secured to the top of the arm 60d by means of rivets 70.

The same operation is obtainable with this construction as with FIGS. 1 and 4, except that the spring 69 serves as a shock absorber and is adapted to yield in the event a person gets off the scale platform too quickly, whereby to eliminate likelihood of the conically pointed end 58d being damaged by more or less hammering on the sharp point thereof.

FIG. 9 illustrates diagrammatically what has been stated above in regard to the advantages of my invention. Lever 14, under weight applied to platform 13, is deflected downwardly and causes extension of the spring 19, which has the loop 53 on the lower end thereof supporting the free end 20 of the lever. By locating the follower pin 52 on the center line of spring 19, so that its lower end 57 moves accurately through the same distance and along the same arc as the loop 53, I can be sure that I am measuring accurately the amount of extension of the spring, whereas if I measured the deflection of the lever 14, let us say at the vertical line xy, short of the loop 53, or took the measurement on the line x'y' beyond the loop 53, the flexing of the lever 14 under load would obviously introduce an error in the reading, and this error would be more or less, depending upon how much weight was applied, as illustrated by the dotted sag line a'b' extending through the loop 53 and intersecting the lines xy and x'y' at z and z', respectively. I have mentioned the flexing of lever 14 only as a result of weight applied thereto directly by platform 13 at 17, but it must be remembered that this lever 14 also assumes the weight applied to the front end of the platform, which is transmitted to the lever 14 through lever 15 at 21, thus further increasing the tendency for lever 14 to sag downwardly under load. Prior art scale constructions having their weight indicating means operated in response to downward deflection of the lever 14, measured anywhere else but on the center line of the spring 19 cannot therefore be accurate, because they do not reflect correctly the extension of the spring 19. In passing, it should be evident that since I operate the weight indicating means by a pin movable exactly on the center line of the weighing spring the same distance as the spring is extended and that this movement cannot be affected by distortion or twisting of the base or platform, due to any one of the usual causes mentioned before, the weight reading obtained is always accurate to a much closer degree than was heretofore considered possible, even if some small inaccuracy is introduced knowingly, as mentioned in connection with such constructions as FIGS. 5, 7 and 8.

Referring next to the related diagram, FIG. 10, it will be seen that the free end 20 of the lever 14 moves in an arc of such a large radius, and the total movement is so small in the deflection from 0 to 250 pounds, that the end 53 of the spring 19 is moved, practically speaking, along a straight line, so far as any perceptible arc to chord error is concerned in the ultimate weight reading. Inasmuch as the pin 52 moves on the center line of the spring and accurately reflects the spring extension, and the upper end 58, by reason of its pivotal connection at 59 with the short arm 60 of the bell-crank lever 38, moves in an arc with the pin 40 as a center instead of having a sliding connection, so as to move along the chord of the arc, there is no arc to chord error introduced in the operation of the bell-crank lever 38 by the pin 52. The long arm of the bell-crank lever 38 operates the rack 35 through the pivotal connection 39, which of course moves in an arc with the same pin 40 as a center about which the pivot 59 moves in its arcuate travel, so that no arc to chord or chord to arc error is introduced and I accordingly obtain weight readings of much closer accuracy than has even been obtainable before in bathroom scales—the errors being reduced to about ⅛ of 1%, which is considered negligible. The floating action of rack 35 in its guide 35' enables it to follow nicely the arc of travel of the lower end of the lever 38. In addition to the important advantage of the close accuracy obtained with my invention, I want to mention the further advantage that the rack 35, by reason of its following the arc and not the chord of the arc, is given a uniform linear movement of .00241" per pound. As a result, the dial 32 can be graduated uniformly throughout the full circumference, allowing a wider spacing of pound graduations and making for easier reading.

It is believed the foregoing description conveys a good understanding of the objects and advantages of my invention. The appended claims have been drawn to cover all legitimate modifications and adaptations.

I claim:

1. A weighing scale comprising a base, weighing levers fulcrumed thereon, a platform movably supported above said base on said levers, a coiled tension spring serving as the weighing spring suspended on said base and connected with said weighing levers to resist downward deflection thereof under weight applied to the platform, weight indicating means, and means for operating said weight indicating means movable in response to downward deflection of said weighing levers, said operating means including a follower pin extending through said spring and disposed on the center line thereof and arranged to move endwise the same distance as the spring is extended in each weighing operation, whereby to operate the weight indicating means so as to give an accurate weight indication.

2. A weighing scale comprising a base, weighing levers fulcrumed thereon, a platform movably supported above said base on said levers, a coiled tension spring serving as the weighing spring suspended on said base and connected with said weighing levers to resist downward deflection thereof under weight applied to the platform, weight indicating means, and means for operating said weight indicating means movable in response to downward deflection of said weighing levers, said operating means including an elongated element disposed parallel to said spring on its center line and movable endwise the same distance as the spring is extended in each weighing operation and having direct low friction pivotal operating connection with the weight indicating means, whereby to operate the weight indicating means so as to give an accurate weight indication.

3. A weighing scale comprising a base, weighing levers fulcrumed thereon, a platform movably supported above said base on said levers, a coiled spring serving as the weighing spring mounted on said base and connected with said weighing levers to resist downward deflection thereof under weight applied to the platform, weight indicating means, and means for operating said weight indicating means movable in response to downward deflection of said weighing levers, said operating means being directly operatively connected with and extending upwardly from the movable end of said spring to move in a straight line the same amount as it moves in each weighing operation and having direct low friction pivotal connection with the weight indicating means, whereby to operate the weight indicating means so as to give an accurate weight indication.

4. A weighing scale comprising a base, weighing levers fulcrumed thereon, a platform movably supported above said base on said levers, a coiled spring serving as the weighing spring mounted on said base and connected with said weighing levers to resist downward deflection thereof under weight applied to the platform, and a telitale element that is disposed parallel to and movable with one end of said spring to the same extent as and in response to deflection of said spring and in a straight line in each weighing operation, said telltale element operating a weight indicator by direct low friction pivotal connection therewith whereby to express the spring elongation directly in terms of weight applied to the platform.

5. A weighing scale comprising a base, weighing levers fulcrumed thereon, a platform movably supported above said base on said levers, a coiled tension spring serving as the weighing spring suspended on said base and connected with said weighing levers to resist downward deflection thereof under weight applied to the platform, weight indicating means, a bell-crank lever pivoted with respect to said base having one arm thereof pivotally connected with said weight indicating means to operate it and having the other arm thereof extending over said spring, and a follower pin extending through said spring and disposed on the center line thereof operatively connecting said last mentioned arm with the extensible end of said coiled spring and movable endwise the same distance as said spring is extended in each weighing operation, whereby to operate the weight indicating means so as to give an accurate weight indication.

6. A weighing scale as set forth in claim 5, wherein the extensible end of said coiled spring supports one end of one of said weighing levers, said weighing lever having the lower end of the follower pin fulcrumed thereon to move along the arc described by the end of said lever in the deflection thereof under load applied thereto by the platform, and the upper end of said follower pin being likewise fulcrumed with respect to the overhanging arm of said bell-crank lever to follow the arc described by said arm.

7. A weighing scale as set forth in claim 5, wherein the extensible end of said coiled spring supports one end of one of said weighing levers, said lever having a V notch provided therein in the crotch of which the lower end of said follower pin is fulcrumed, and the overhanging arm of said bell-crank lever also having a V formation in which the upper end of said follower pin is fulcrumed.

8. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being guided thereby.

9. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being guided thereby, the extensible end of said spring supporting one end of one of said weighing levers, and the lower end of said follower pin being fulcrumed on said lever and the upper end of said follower pin being fulcrumed on the overhanging arm of said bell-crank lever.

10. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being closely guided thereby for endwise movement, the upper and lower ends of said follower pin being pointed, the extensible end of said spring supporting one end of one of said weighing levers, a flat bearing surface being provided on said lever for slidable fulcrum engagement by the pointed lower end of said pin, and the overhanging arm of said bell-crank lever providing a flat surface on its under side for slidable fulcrum engagement by the pointed upper end of said pin.

11. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being guided thereby, the upper and lower ends of said pin being pointed, the extensible end of said coiled spring supporting one end of one of said weighing levers, said weighing lever having a V notch provided therein receiving in the crotch thereof the pointed lower end of said pin, and the overhanging arm of said bell-crank lever having a conical depression provided therein open to the underside thereof in the apex of which the pointed upper end of said pin is received.

12. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being guided thereby, the upper and lower ends of said pin being pointed, the extensible end of said coiled spring supporting one end of one of said weighing levers, said weighing lever having a V notch provided therein receiving in the crotch thereof the pointed lower end of said pin, and the overhanging arm of said bell-crank lever having a conical depression provided therein open to the underside thereof in the apex of which the pointed upper end of said pin is received, said conical depression being provided in a separate spring member mounted on said overhanging arm and yieldable upwardly with respect thereto for shock absorption.

13. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being closely guided thereby for endwise movement, the upper end of said follower pin being pointed and the overhanging arm of said bell-crank lever having a flat surface on the underside thereof for slidable fulcrum engagement with the upper end of said pin, the extensible end of said coiled spring supporting one end of one of said weighing levers, and the lower end of said pin being pivotally connected with said lever.

14. A weighing scale as set forth in claim 5, including a tubular screw on which the upper end of said coiled tension spring is suspended for back to zero adjustment, and a manually adjustable nut threaded on said screw for the back to zero adjustment, said follower pin extending through the bore in said tubular screw and being closely guided thereby for endwise movement, the upper end of said follower pin being pointed and the overhanging arm of said bell-crank lever having a flat surface on the underside thereof for slidable fulcrum engagement with the upper end of said pin, the extensible end of said coiled spring supporting one end of one of said weighing levers, said lever having an arcuate bearing surface provided thereon on the top of the end thereof struck on an arc with the pivotal connection of said spring with the end of said lever as a center, and the lower end of said pin having a complementary arcuate bearing surface provided thereon slidably engaging the arcuate bearing surface on said lever.

15. A weighing scale comprising a base, weighing levers fulcrumed thereon, a platform movably supported above said base on said levers, a weighing spring yieldably supporting said weighing levers and having a movable end adapted to be deflected thereby, weight indicating means, and means for operating the latter movable in response to spring deflection, said operating means including a follower pin, one end of which is connected with and moves with the movable end of said spring in a straight line to measure deflection thereof, the other end operating the weight indicating means accordingly by direct low friction pivotal engagement therewith.

16. A weighing scale comprising a base, weighing levers fulcrumed thereon, a platform movably supported above said base on said levers, a coiled tension spring serving as the weighing spring suspended on said base and connected with said weighing levers to resist downward deflection thereof under weight applied to the platform, weight indicating means, a bell-crank lever pivoted with respect to said base having one arm thereof pivotally connected with said weight indicating means to operate it and having the other arm thereof extending over said spring, and an elongated part having one end pivotally connected with one of said weighing levers to travel in an arc described by the extensible end of said spring as said lever is deflected under load and having the other end pivotally connected with the overhanging arm of said bell-crank lever, whereby to indicate accurately the weight applied to said platform by reason of direct reflection of the amount of spring extension and avoidance of arc to chord or chord to arc errors in the operation of the weight indicating means.

17. A weighing scale comprising a base, weighing levers fulcrumed thereon, a platform movably supported above said base on said levers, a weighing spring having a lower end yieldably supporting said weighing levers and having an upper end adjustably fixedly supported, weight indicating means, and means for operating the latter movable in response to spring deflection, including a bell-crank lever pivoted with respect to said base having one arm thereof pivotally connected with said weight indicating means to operate it and having the other arm thereof extending over said spring and movable in vertically spaced relation to the fixed upper end of the latter, and a follower pin extending upwardly through said spring from the weighing levers up to said last mentioned arm for operatively connecting said last mentioned arm with said spring to shift said arm according to the spring deflection.

18. A weighing scale comprising a base, weighing levers fulcrumed thereon, a platform movably supported above said base on said levers, a weighing spring yieldably supporting said weighing levers, weight indicating means, and means for operating the latter movable in the response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, wherein the spring supporting one end of one of said weighing levers, said weighing lever having the lower end of the follower pin fulcrumed thereon to move along the arc described by the end of said lever in the deflection thereof under load applied thereto by the platform, and the upper end of said follower pin being likewise fulcrumed with respect to the overhanging arm of said bell-crank lever to follow the arc described by said arm.

19. A weighing scale comprising a base, weighing levers fulcrumed thereon, a platform movably supported above said base on said levers, a weighing spring yieldably supporting said weighing levers, weight indicating means, and means for operating the latter movable in response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, the spring supporting one end of one of said weighing levers, said lever having a V notch provided therein in the crotch of which the lower end of said follower pin is fulcrumed, and the overhanging arm of said bell-crank lever also having a V formation in which the upper end of said follower pin is fulcrumed.

20. A weighing scale comprising a base, weighing levers fulcrumed thereon, a platform movably supported above said base on said levers, a weighing spring yieldably supporting said weighing levers, weight indicating means, and means for operating the latter movable in response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, the spring supporting one end of one of said weighing levers, the upper and lower ends of said pin being pointed, said spring supporting one end of one of said weighing levers, said weighing lever having a V notch provided therein receiving in the crotch thereof the pointed lower end of said pin, and the overhanging arm of said bell-crank lever having a conical depression provided therein open to the underside thereof in the apex of which the pointed upper end of said pin is received.

21. A weighing scale comprising a base, weighing levers fulcrumed thereon, a platform movably supported above said base on said levers, a weighing spring yieldably supporting said weighing levers, weight indicating means, and means for operating the latter movable in response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, the spring supporting one end of one of said weighing levers, the upper and lower ends of said pin being pointed, said spring supporting one end of one of said weighing levers, said weighing lever having a V notch provided therein receiving in the crotch thereof the pointed lower end of said pin, and the overhanging arm of said bell-crank lever having a conical depression provided therein open to the underside thereof in the apex of which the pointed upper end of said pin is received, said conical depression being provided in a separate spring member mounted on said overhanging arm and yieldable upwardly with respect thereto for shock absorption.

22. A weighing scale comprising a base, weighing levers fulcrumed thereon, a platform movably supported above said base on said levers, a weighing spring yieldably supporting said weighing levers, weight indicating means, and means for operating the latter movable in response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, means closely guiding said pin intermediate the ends thereof, the upper and lower ends of said pin being pointed, said spring supporting one end of one of said weighing levers, a flat bearing surface being provided on said lever for slidable fulcrum engagement by the pointed lower end of said pin, and the overhanging arm of said bell-crank lever providing a flat surface on its under side for slidable fulcrum engagement by the pointed upper end of said pin.

23. A weighing scale comprising a base, weighing levers fulcrumed thereon, a platform movably supported above said base on said levers, a weighing spring yieldably supporting said weighing levers, weight indicating means, and means for operating the latter movable in response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, means closely guiding said pin intermediate the ends thereof, said spring supporting one end of one of said weighing levers, the upper end of said follower pin being pointed and the overhanging arm of said bell-crank lever having a flat surface on the underside thereof for slidable fulcrum engagement with the upper end of said pin, and the lower end of said pin being pivotally connected with said lever.

24. A weighing scale comprising a base, weighing levers fulcrumed thereon, a platform movably supported above said base on said levers, a weighing spring yieldably supporting said weighing levers, weight indicating means, and means for operating the latter movable in response to spring deflection, including a bell-crank lever pivoted with respect to said base having one arm thereof pivotally connected with said weight indicating means to operate it and having the other arm thereof extending over said spring, and a follower pin operatively connecting said last mentioned arm with said spring to shift said arm according to the spring deflection, means closely guiding said pin intermediate the ends thereof, said spring supporting one end of one of said weighing levers, the upper end of said follower pin being pointed and the overhanging arm of said bell-crank lever having a flat surface on the underside thereof for slidable fulcrum engagement with the upper end of said pin, said lever having an arcuate bearing surface provided thereon on the top of the end thereof struck on an arc with the pivotal connection of said spring with the end of said lever as a center, and the lower end of said pin having a complementary arcuate bearing surface provided thereon slidably engaging the arcuate bearing surface on said lever.

References Cited in the file of this patent

UNITED STATES PATENTS

| | | |
|---|---|---|
| 1,895,863 | Pollak | Jan. 31, 1933 |
| 1,900,964 | Weber | Mar. 14, 1933 |
| 1,942,114 | Michelin | Jan. 2, 1934 |
| 2,061,271 | Eschenbacher et al. | Nov. 17, 1936 |
| 2,105,219 | Kircher | Jan. 11, 1938 |
| 2,126,377 | Fear et al. | Aug. 9, 1938 |
| 2,156,325 | Whitney | May 2, 1939 |
| 2,306,740 | Middleman | Dec. 29, 1942 |
| 2,311,264 | Stimson et al. | Feb. 16, 1943 |
| 2,766,038 | Weber | Oct. 9, 1956 |

UNITED STATES PATENT OFFICE
CERTIFICATE OF CORRECTION

Patent No. 3,022,845                      February 27, 1962

Mike A. Provi

It is hereby certified that error appears in the above numbered patent requiring correction and that the said Letters Patent should read as corrected below.

Column 1, line 40, for "as", second occurrence, read -- in --; column 3, line 16, for "horizontal" read -- horizontally --; line 36, after "pin" insert -- or --; column 6, line 46, for "arc and not the chord" read -- arc and not the <u>chord</u> --; column 10, line 2, strike out "the", second occurrence --; line 9, strike out "wherein".

Signed and sealed this 21st day of August 1962.

(SEAL)
Attest:

ESTON G. JOHNSON

Attesting Officer

DAVID L. LADD
Commissioner of Patents